US012703327B2

(12) United States Patent
Forstner et al.

(10) Patent No.: US 12,703,327 B2
(45) Date of Patent: Aug. 11, 2026

(54) FILLING DEVICE FOR A VEHICLE, AND VEHICLE HAVING SUCH A FILLING DEVICE

(71) Applicant: Bayerische Motoren Werke Aktiengesellschaft, Munich (DE)

(72) Inventors: Michael Forstner, Aufhausen (DE); Thorsten Hambusch, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 365 days.

(21) Appl. No.: 18/285,400

(22) PCT Filed: Mar. 16, 2022

(86) PCT No.: PCT/EP2022/056830
§ 371 (c)(1),
(2) Date: Oct. 3, 2023

(87) PCT Pub. No.: WO2022/214285
PCT Pub. Date: Oct. 13, 2022

(65) Prior Publication Data
US 2024/0181994 A1 Jun. 6, 2024

(30) Foreign Application Priority Data
Apr. 8, 2021 (DE) ..................... 10 2021 108 805.4

(51) Int. Cl.
*B60S 1/50* (2006.01)

(52) U.S. Cl.
CPC ...................................... *B60S 1/50* (2013.01)

(58) Field of Classification Search
CPC ...... B60K 15/04; B60K 15/05; B60K 15/053; B60K 2015/0477; B60S 1/50
(Continued)

(56) References Cited

U.S. PATENT DOCUMENTS 1,324,995 A 12/1919 Bowers
2,508,124 A 5/1950 Stephenson
(Continued)

FOREIGN PATENT DOCUMENTS

CA 2235300 A1 10/1998
CN 205396032 U 7/2016
(Continued)

OTHER PUBLICATIONS

English translation of DE 10 2018 208 398; retrieved via Patent Translate located at www.epo.org. (Year: 2025).*
(Continued)

*Primary Examiner* — Jason S Daniels
(74) *Attorney, Agent, or Firm* — Crowell & Moring LLP

(57) ABSTRACT

A filling device for a motor vehicle includes a vehicle body flap forming at least part of a vehicle skin and being designed to pivot between a first position and a second position differing from the first position. The vehicle body flap has an opening. A container stores a fluid. A filler neck is provided on the vehicle body flap such that the container can be filled with fluid in a direction of flow via the opening and the filler neck, the filler neck forming a channel that connects the opening in the vehicle body flap to the container. In the area of the opening, the channel has a filling portion in which a baffle wall is formed that reduces the flow cross-section in relation to the opening located upstream of the baffle wall and in relation to a portion of the channel located downstream of the baffle wall.

7 Claims, 6 Drawing Sheets

(58) Field of Classification Search
USPC .......................................................... 296/1.07
See application file for complete search history.

(56) References Cited

U.S. PATENT DOCUMENTS

| | | | |
|---|---|---|---|
| 3,341,214 A | 9/1967 | Komenda | |
| 4,185,844 A * | 1/1980 | Hubbard | B60K 15/04 280/834 |
| 4,706,719 A | 11/1987 | Eversdijk | |
| 4,886,182 A | 12/1989 | Fedelem et al. | |
| 6,810,932 B1 | 11/2004 | Corven et al. | |
| 7,677,631 B1 | 3/2010 | Zischke et al. | |
| 10,906,392 B2 * | 2/2021 | Padilla Heredia | B60K 15/03504 |
| 2016/0046184 A1 | 2/2016 | Luehn et al. | |
| 2017/0137000 A1 | 5/2017 | Huebner et al. | |
| 2019/0084411 A1 | 3/2019 | Husberg et al. | |
| 2021/0031728 A1 | 2/2021 | Hambusch | |

FOREIGN PATENT DOCUMENTS

| | | | |
|---|---|---|---|
| CN | 207790626 U | 8/2018 | |
| CN | 109515171 A | 3/2019 | |
| CN | 111971209 A | 11/2020 | |
| DE | 1 227 358 A | 10/1966 | |
| DE | 197 16 812 A1 | 10/1998 | |
| DE | 199 07 389 A1 | 8/2000 | |
| DE | 10 2013 004 926 A1 | 9/2014 | |
| DE | 10 2013 012 630 A1 | 1/2015 | |
| DE | 20 2016 106 334 U1 | 3/2017 | |
| DE | 10 2018 208 398 A1 | 11/2019 | |
| DE | 10 2018 128 853 A1 | 5/2020 | |
| EP | 1857372 A1 * | 11/2007 | F01M 11/0408 |
| EP | 2752326 A1 * | 7/2014 | B60K 15/077 |
| FR | 2 895 357 A1 | 6/2007 | |
| FR | 2 895 358 A3 | 6/2007 | |
| GB | 431604 A | 7/1935 | |
| GB | 618450 A | 2/1949 | |
| JP | 5-37619 U | 5/1993 | |
| JP | 2012-116274 A | 6/2012 | |
| JP | 2012-224141 A | 11/2012 | |
| KR | 10-2008-0019339 A | 3/2008 | |
| WO | WO 2019/229003 A1 | 12/2019 | |

OTHER PUBLICATIONS

English translation of DE 10 2018 128 853; retrieved via Patent Translate located at www.epo.org. (Year: 2025).*

U.S. Non-Final Office Action issued in U.S. Appl. No. 18/285,395 dated Aug. 21, 2025 (14 pages).

International Search Report (PCT/ISA/210) issued in PCT Application No. PCT/EP2022/056831 dated Jul. 11, 2022 with English translation (4 pages).

German-language Written Opinion (PCT/ISA/237) issued in PCT Application No. PCT/EP2022/056831 dated Jul. 11, 2022 with English translation (8 pages).

German-language Office Action issued in German Application No. 10 2021 108 806.2 dated Feb. 22, 2022 (6 pages).

International Search Report (PCT/ISA/210) issued in PCT Application No. PCT/EP2022/056830 dated Jul. 11, 2022 with English translation (4 pages).

German-language Written Opinion (PCT/ISA/237) issued in PCT Application No. PCT/EP2022/056830 dated Jul. 11, 2022 with English translation (9 pages).

German-language Office Action issued in German Application No. 10 2021 108 805.4 dated Feb. 22, 2022 (7 pages).

English translation of Chinese-language Office Action issued in Chinese Application No. 202280012202.0 dated Dec. 26, 2025 (4 pages).

* cited by examiner

FILLING DEVICE FOR A VEHICLE, AND VEHICLE HAVING SUCH A FILLING DEVICE

CROSS REFERENCE TO RELATED APPLICATION

This application contains subject matter related to U.S. application Ser. No. 18/285,395, entitled "Filling Device for a Vehicle, and Vehicle Having Such a Filling Device," filed on even date herewith.

BACKGROUND AND SUMMARY

The present invention relates to a filling apparatus for a vehicle, in particular for a motor vehicle, and to a vehicle having such a filling apparatus.

In conventional vehicles such as motor vehicles, filling apparatuses are known, for example, in the context of the filling of a wash water container of a conventional windshield washing system.

Generally, in conventional windshield washing systems, provision is made of a filler neck for the wash water container below a body flap, such as a vehicle front flap, or below an engine hood in the engine compartment.

Alternative designs provide the filler neck, for example, in a water channel of a rear flap of the vehicle. Further designs provide for filling of the wash water container via a hood gap, for example, between the engine hood and the fender.

If the vehicle has a front flap which is intended to be actuated only in a workshop by means of a special tool and which is largely referred to as a so-called "service flap", the filler neck of the wash water container is not readily accessible. The provision of visible individual flaps or covers in body elements, which are subject to specific design requirements, is, for design and manufacturing reasons, generally avoided if this is possible.

A further embodiment known from the prior art is shown in FIG. 1, which illustrates a schematic view of a filling apparatus 1' belonging to the prior art in a cross-sectional view.

In principle a vehicle, in particular a motor vehicle, not shown in more detail in FIG. 1, comprises the filling apparatus 1' which has a body flap 2' which at least sectionally forms an outer skin of the vehicle and is configured to be pivoted between a first position and a second position which differs from the first position, wherein the body flap 2' has an opening 7' as shown in FIG. 1. In the case shown, the body flap 2' is a vehicle body outer part, in particular a front flap or an engine hood, of the vehicle.

The second position corresponds to a conventional open position of the front flap or the engine hood so that the engine compartment is accessible, while the first position is a conventional closed position of the front flap or engine hood.

The filling apparatus 1' also comprises a device for opening and closing the opening 7' by means of a pivotable cover element 4' provided on the opening 7', and a filler neck which is arranged in relation to the opening such that the filler neck 3' can be filled with a fluid such as a windshield washer fluid via the opening 7' when the body flap 2' is in the first position, i.e. when the body flap 2' is in the closed position.

The device for opening and closing comprises a bearing arrangement 5' which pivotably mounts the cover element 4' on the filler neck 3'. Accordingly, the cover element 4' can be moved for opening the opening 7' and for closing the opening 7', wherein in the position closing the opening 7' the cover element 4' bears sealingly against the body flap 2'.

The filler neck 3' is connected to a container 9' for windshield wiper fluid so that the container 9' for the windshield wiper fluid can be filled via the filler neck. The filler neck 3' and the container 9' for windshield wiper fluid are designed as separate components. In particular, the filler neck 3' is connected to the body flap 2' such that when the body flap 2' is pivoted from the first position in the direction of the second position the filler neck 3' and the cover element 4' move along with the body flap 2', while the container 9' for windshield wiper water remains positionally fixed in relation to the vehicle body.

If the body flap 2' is moved from the second position back to the first position, a lower end portion or edge portion 10' of the filler neck 3' and an opening portion 12' of the container 9 for windshield wiper fluid are sealingly in engagement or in contact with one another, such that the lower end portion is provided with a conically designed sealing ring which in the opening portion 12' is introduced via a frictional and/or form-fitting connection, as shown in FIG. 1.

For example, an emblem, not illustrated in more detail, can be provided at an outer side of the cover element 4' such that the cover element 4' is concealed or inconspicuous from a visual or design aspect.

When the vehicle is in operation, however, in the case of the filling apparatus 1' belonging to the prior art, in the event of emergency braking of the vehicle from a higher speed, wash water can slosh out or flow out from the filler neck 3' which is positioned below the cover element 4'; even if in the closed position the cover element 4' bears against the body flap 2' or the opening 7' in order to achieve a certain sealing action.

FIG. 2*a* shows schematically a filling apparatus 1' similar to FIG. 1 in which, in the case of a fluid or water level 14' in the container 9', the escape of the surge of water 16' is illustrated schematically if emergency braking of the vehicle is carried out and the cover element 4' is in the open position.

FIG. 2*b* shows a different perspective view of the filling apparatus of FIG. 2*a* in which a filling opening 18' of the filler neck 3' can be identified more clearly. Due to the high water level 14' in the container 9', the water level in the connecting piece/filler neck 3' is also correspondingly high so that it has been established in tests that a surge of water can escape from the opening 7' even when the cover element 4' is closed.

Obvious measures to counter the wash water sloshing out could be the use of alternative closure covers of various types, the provision of a check valve, for example in the form of a diaphragm, the design of a portion of the filler neck in the form of a labyrinth, the provision of sealing lips, etc.

If such measures are taken, however, a blocking effect occurs during filling, which could be avoided for example via separate ventilation hoses, as are often used in tank systems.

The above effect is illustrated in more detail by way of FIG. 3 in the example of using a check valve.

As shown in FIG. 3 if the water is prevented from sloshing out by a check valve 50', filling is prevented because there is no possibility of venting, since the check valve 50' does not open against the existing air cushion.

If the check valve 50' is not pretensioned, however, it does not hold back the surge of water. If the filling opening 18' of the filler neck 3' is instead significantly reduced, then the air cushion L in the storage container has little possibility of escaping so that filling is also difficult due to capillary action. Due to the check valve 50' it can also lead to a water back-up 60' above the check valve 50' so that ultimately in the event of emergency braking wash water can slosh out from the filler neck 3' via the opening 7'.

Thus, it is an object of the present invention to provide a filling apparatus and a motor vehicle having such a filling apparatus which can remedy the above-described problems of the prior art.

In particular, it is an object of the present invention to provide a filling apparatus and a motor vehicle having such a filling apparatus which can avoid or at least reduce a fluid sloshing out, preferably without at the same time impeding the filling of the container.

This object is achieved by a filling apparatus and by a vehicle having such a filling apparatus, in accordance with the independent claims.

Advantageous configurations and refinements of the invention emerge from the dependent claims.

The filling apparatus according to the invention is provided for a vehicle, in particular for a motor vehicle, and comprises:

- a body flap which at least sectionally forms an outer skin of the vehicle and is configured to be pivoted between a first position and a second position, which differs from the first position, wherein the body flap has an opening;
- a container for storing a fluid; and
- a filler neck which is provided on the body flap such that the container can be filled with fluid in a direction of flow via the opening and the filler neck,
- wherein the filler neck forms a channel which connects the opening in the body flap to the container, wherein in the region of the opening the channel has a filling portion in which a baffle is formed, the baffle reducing the flow cross section in relation to the opening arranged upstream of the baffle and in relation to a channel portion situated downstream of the baffle.

Accordingly, the filler neck can be designed as a filler pot with a baffle in the region of the opening with the filling portion, wherein the channel can be vented without a valve.

The baffle which is horizontally oriented in the vehicle coordinate system reduces the flow cross section to approximately ⅔ of the original flow cross section of the filling opening without the baffle, so that it is not possible for the water which is situated in the storage system to escape.

Filling through the remaining filling opening is possible, however, since a ventilation pipe which terminates above a conceivable water level is preferably added. The filler neck is preferably produced as a separate part with an injection-molding tool, i.e. by means of an injection-molding method. Additional slides can be avoided by positioning in a tool parting plane. In other words, an upper face of the filler neck can be shaped by half of an injection-molding tool, while a lower face can be shaped by the other slide or in this case by a slide which is already present. A cavity is free of undercuts, which would prevent a removal of the finished component from the tool. If these undercuts were present it might be necessary to integrate additional slides in the tool, if possible, or additional parts would have to be mounted.

The filling apparatus according to the invention can be advantageously designed such that a filling opening formed by the baffle determines the reduced flow cross section, wherein a ventilation pipe is formed adjacent to the filling opening, the one end portion thereof extending from the baffle in the direction upstream of the opening and/or the other end portion thereof extending downstream in relation to the baffle.

The filling apparatus according to the invention can also be developed such that the filler neck and the container are designed such that the baffle and the ventilation pipe are arranged above a fluid filling level in the filler neck, which is based on a predetermined maximum fluid filling level of the container.

Moreover, the filling apparatus according to the invention can be implemented such that the filler neck and the container are designed such that the baffle is arranged above a fluid filling level in the filler neck, which is based on a predetermined maximum fluid filling level of the container.

The filling apparatus according to the invention can also be implemented such that the baffle reduces the flow cross section by ½ to ¾, preferably by at least ⅔ to ¾, for example by 72%, in relation to the flow cross section of the channel portion situated downstream of the baffle. As the ventilation pipe is also provided in the vicinity of the baffle, preferably a flow cross section of 17% remains in relation to the original flow cross section without the baffle and without the ventilation pipe.

The filling apparatus according to the invention can also be implemented such that the filler neck is designed as a separate component and is shaped such that it can be inserted with a lower end portion downstream of the baffle into a container neck of the container.

Moreover, the filling apparatus according to the invention can be developed such that the filler neck is produced as a separate component by injection-molding.

The vehicle according to the invention is, in particular, a motor vehicle and comprises the filling apparatus according to the invention.

This results in the properties and advantages mentioned in connection with the filling apparatus according to the invention in the same way, and for this reason, to avoid repetitions, reference is made to the above embodiments in connection with the filling apparatus according to the invention.

A preferred embodiment of the invention will be described below by way of example with reference to the figures.

DETAILED DESCRIPTION OF THE DRAWINGS

Figure 1:
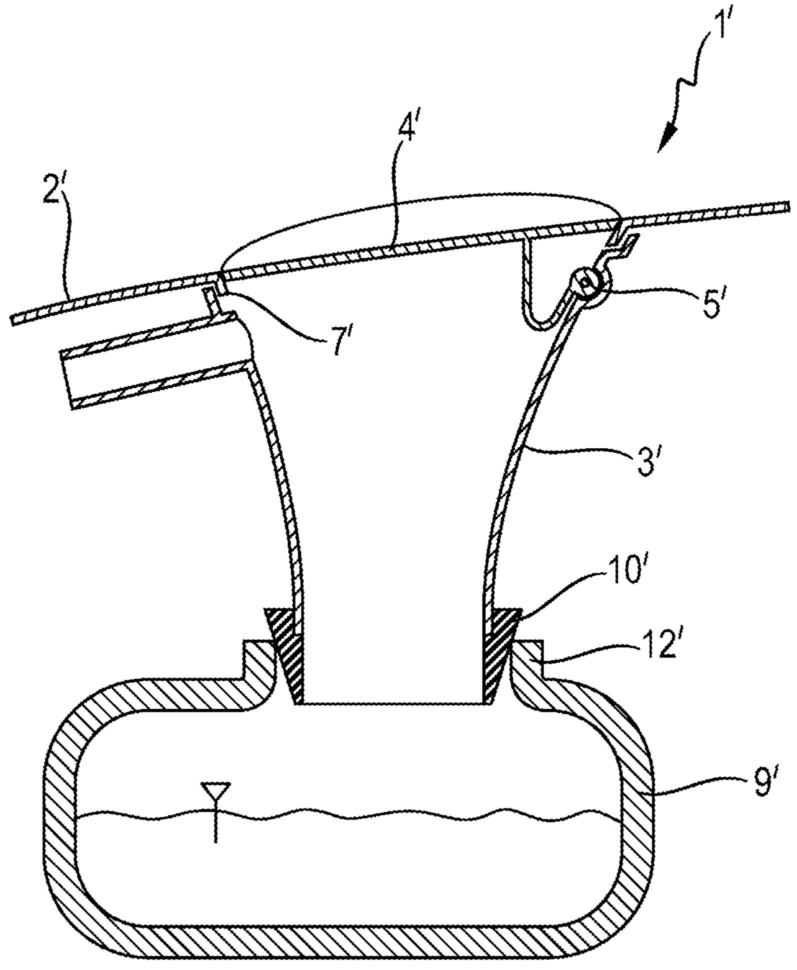
FIG. 1 is a cross-sectional view of a filling apparatus known from the prior art.
Figure 2A:
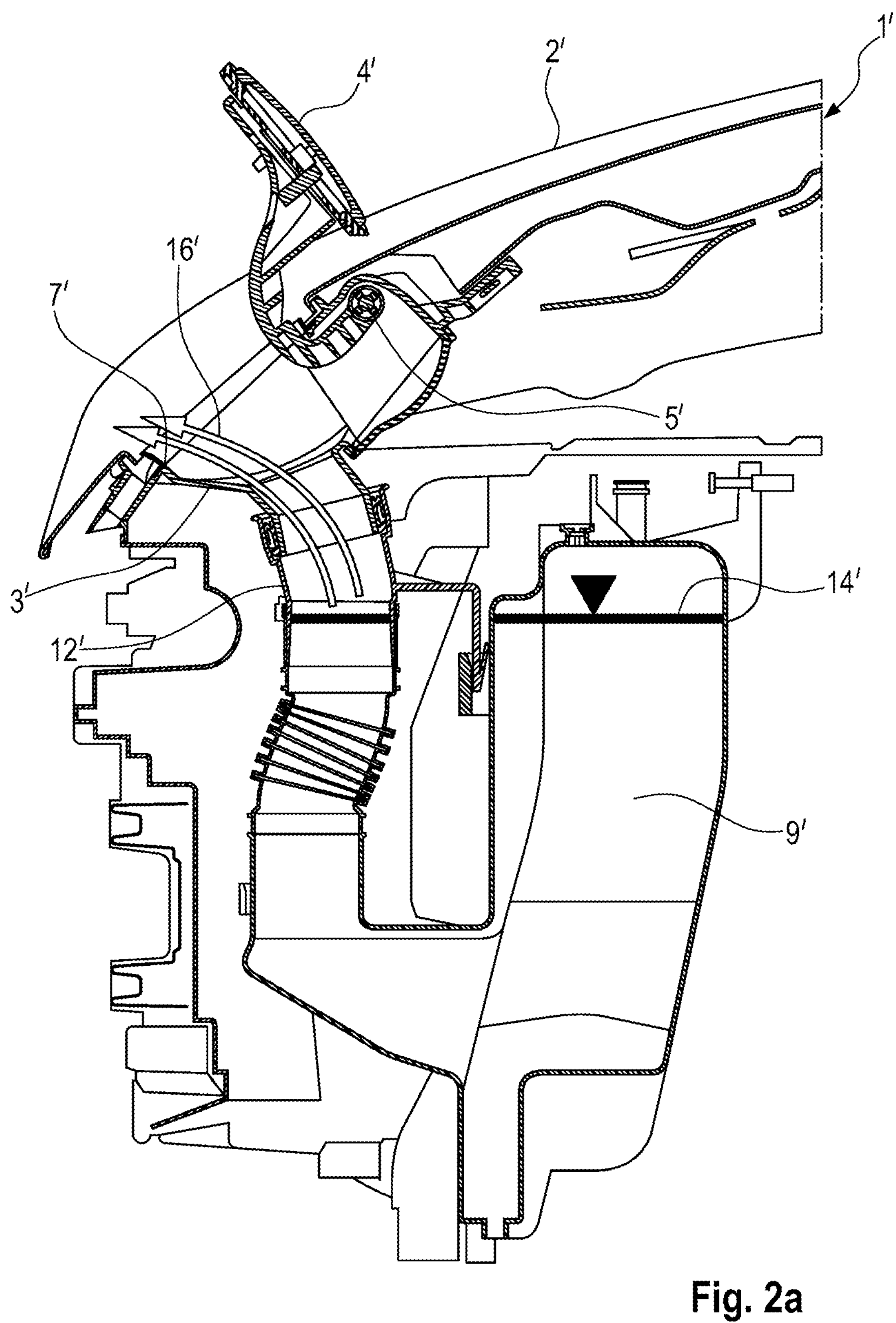
FIGS. 2*a* and 2*b* are views of a conventional filling apparatus similar to FIG. 1.
Figure 2B:
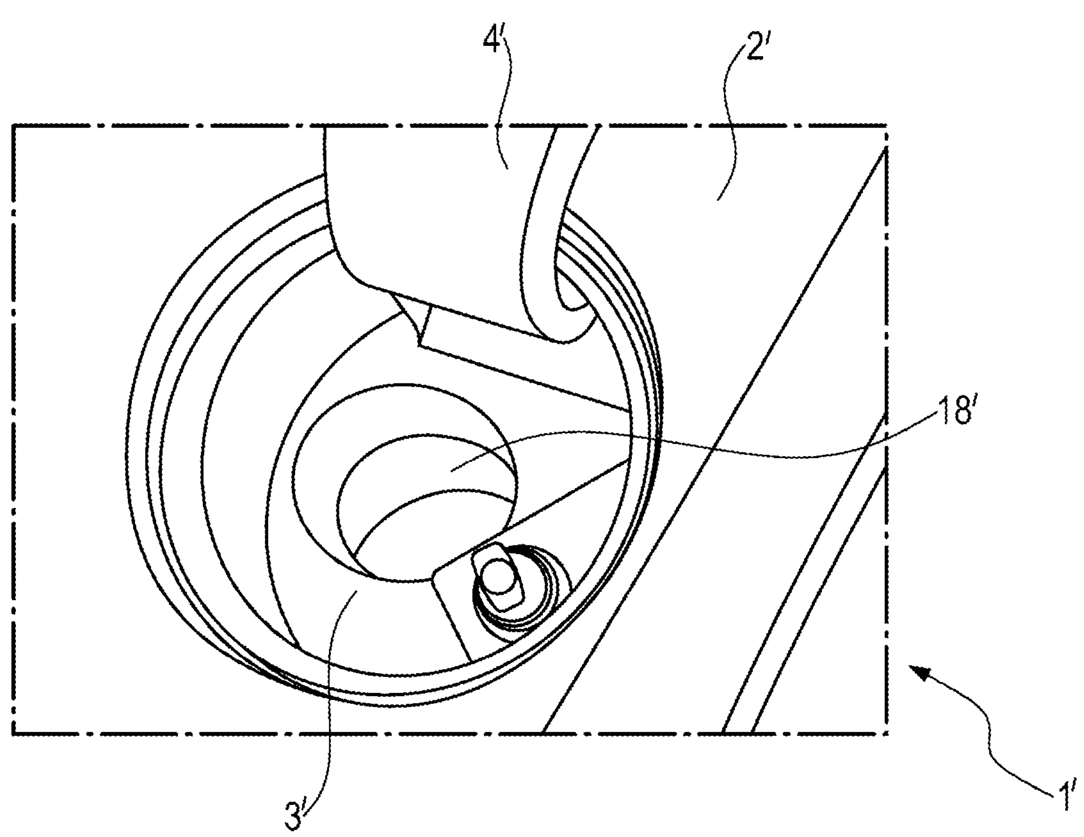
Figure 3:
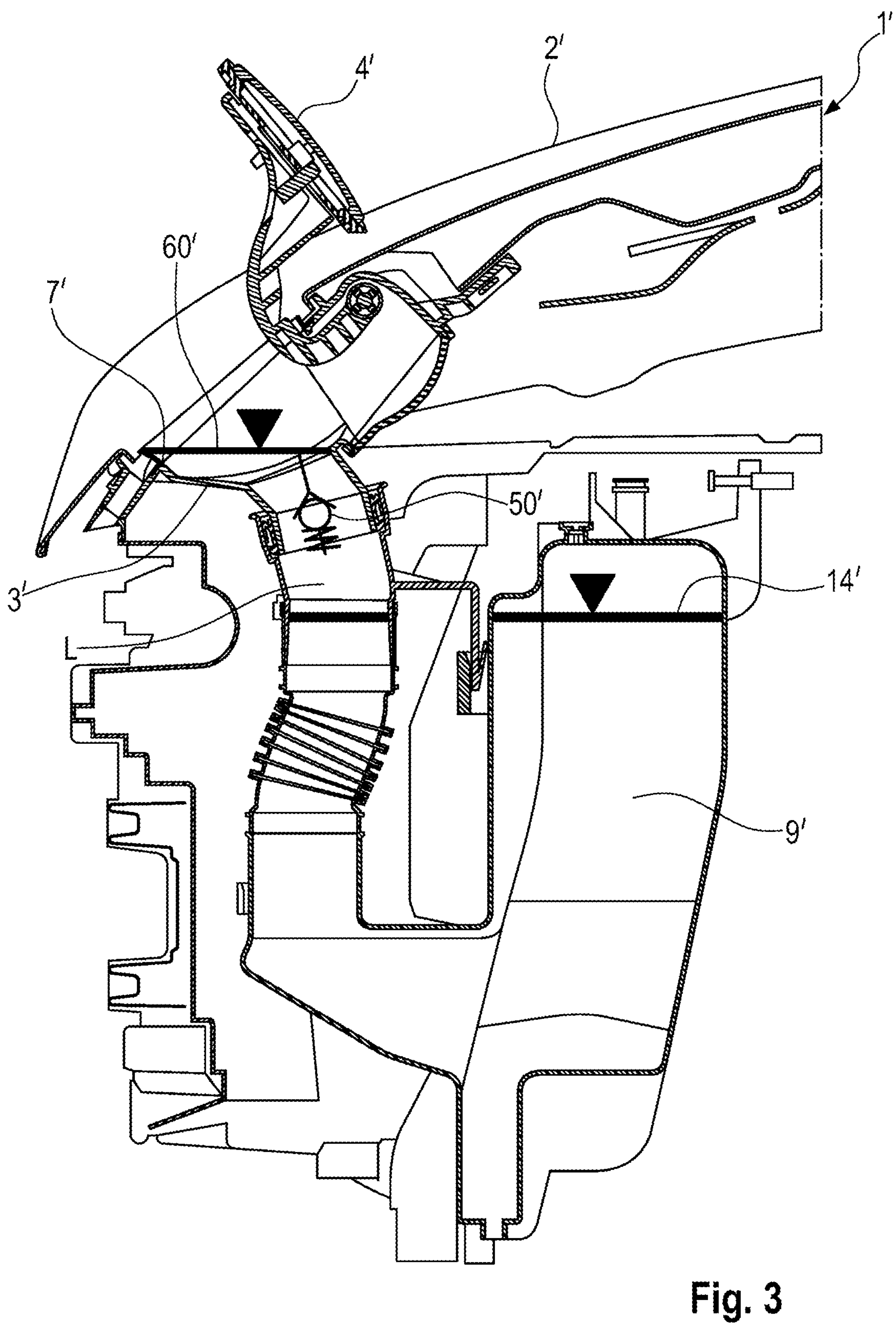
FIG. 3 is a view of a conventional filling apparatus having a check valve.
Figure 4:
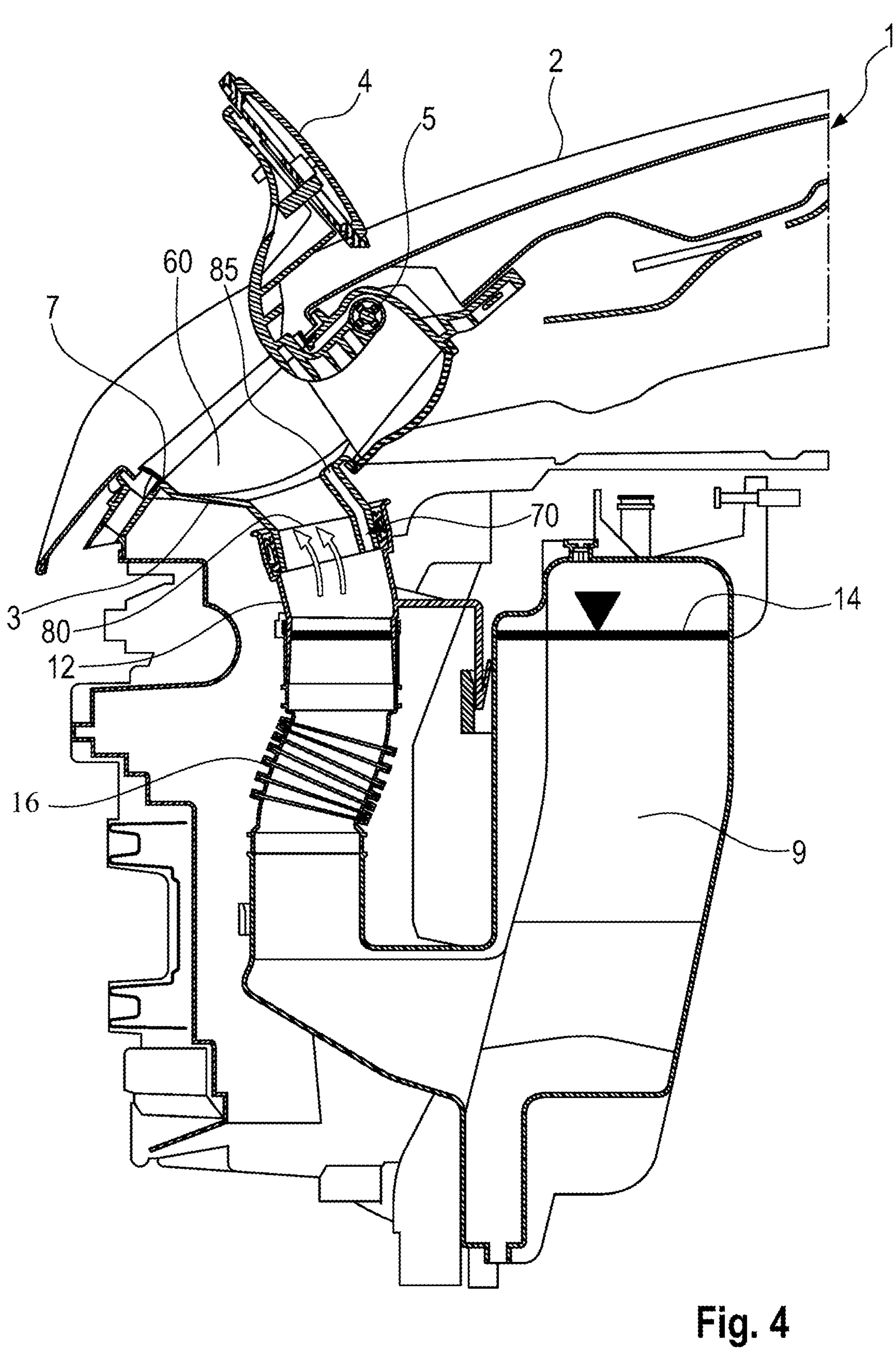
FIG. 4 shows, in a cross-sectional view, a schematic illustration of a filling apparatus according to an embodiment of the invention.

FIG. 4 shows, in a cross-sectional view, a schematic view of a filling apparatus 1 according to an embodiment of the invention, wherein elements of the filling apparatus 1 which are the same or similar in relation to those of the filling apparatuses 1' belonging to the prior art and shown in FIGS. 1-3 are provided with identical or similar reference signs. In the following description only the differences in relation to the filling apparatuses 1' belonging to the prior art will be explained in more detail.

Figure 5:
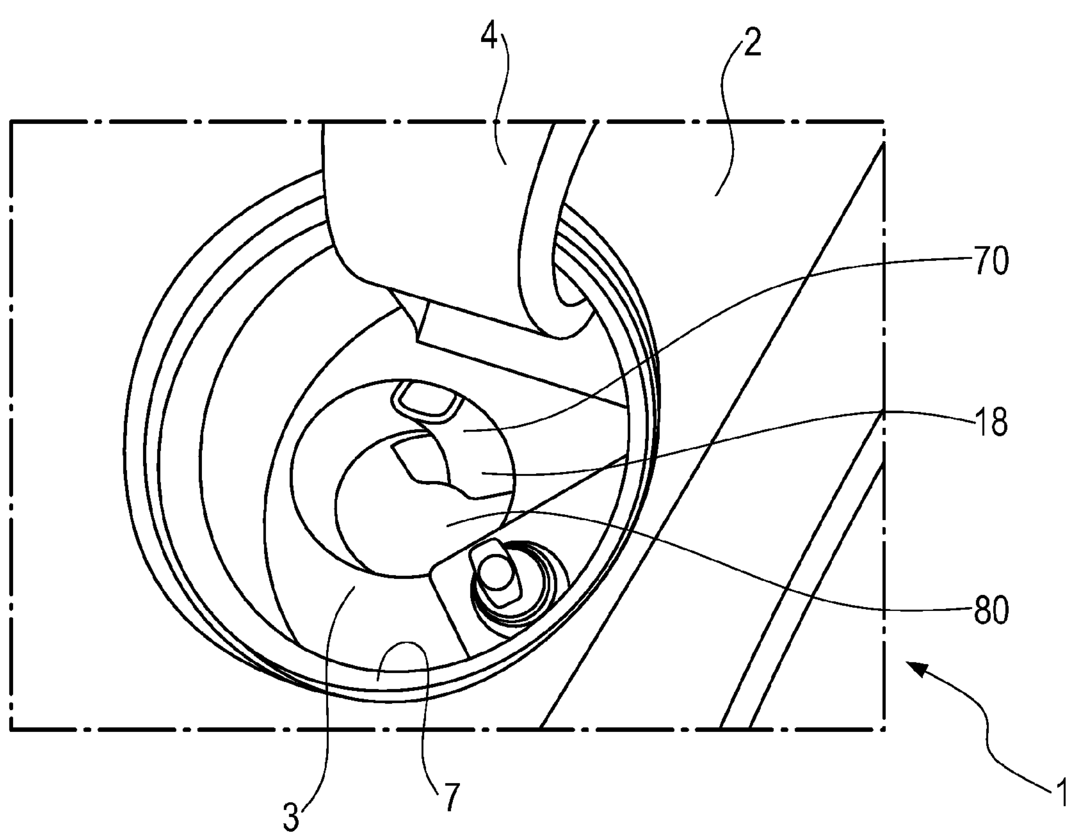
FIG. 5 shows, in a perspective view from above, a schematic illustration of the filling apparatus of FIG. 4.

As shown in FIGS. 4 and 5, the filling apparatus 1 is provided for a vehicle, not shown in more detail, which in this embodiment is a motor vehicle.

The filling apparatus 1 comprises a body flap 2 which is formed as a vehicle body outer part by a front flap or an engine hood of the vehicle, and thus sectionally forms an outer skin of the vehicle.

The body flap 2 is designed to be pivoted between a first position and a second position which differs from the first position, wherein the body flap 2, which is designed as a front flap or engine hood, in the first position is in a closed state, i.e. closes the engine compartment of the vehicle, while the body flap 2 in the second position is in an open state, i.e. opens up the engine compartment of the vehicle or makes it accessible from outside.

The body flap 2 also has an opening 7 which can be closed or opened via a cover 4 on which an emblem can be provided.

The filling apparatus 1 also has a container 9 for storing a fluid, in this case for storing windshield wiper water or wash water, and which is fixedly fastened to the vehicle structure and which also has a filler neck 3 which is attached to the body flap 2 such that the filler neck 3 together with the body flap 2 is pivotable in relation to the container 9 between the first position and the second position and is connected to the opening 2.

An end portion of the filler neck 3 which is designed in the form of a centering cone, as visible in FIG. 4, when the body flap 2 is in a first position, is inserted sectionally into an opening portion 12 of the container 9 such that the container 9 can be filled with fluid via the opening 7 and the filler neck 3, as illustrated in FIG. 4.

As also visible in FIG. 4, the opening portion 12 is designed in the form of a funnel for receiving the centering cone. The funnel is connected via a folding bellows 16 to the container 9.

As already mentioned, the filler neck 3 is provided on the body flap such that the container 9 can be filled with fluid in a direction of flow via the opening 7 and the filler neck 3. The filler neck thus forms a channel which connects the opening 7 in the body flap 2 with the container 9, wherein in the region of the opening 7 the channel has a filling portion in the form of a filler pot in which a baffle 80 is formed.

The baffle 80 reduces the flow cross section in relation to the opening 7 arranged upstream of the baffle 80 and in relation to a remaining channel portion of the channel downstream of the baffle 80.

As can also be identified in FIGS. 4 and 5, a filling opening 18 formed by the baffle 80 determines the reduced flow cross section, wherein a ventilation pipe 70 is designed adjacent to the filling opening 18, the one upper end portion thereof extending from the baffle 80 in the direction upstream of the opening 7 and the other lower end portion thereof extending downstream in relation to the baffle 80.

As is also illustrated in particular in FIG. 4, the filler neck 3 and the container 9 are designed such that the baffle 80 and the ventilation pipe 70 are arranged above a fluid filling level in the filler neck 3, which is based on a predetermined maximum fluid filling level 14 of the container 9.

The baffle 80 reduces the flow cross section in this exemplary embodiment by at least ⅔ to ¾, preferably by 72%, in relation to the flow cross section of the channel portion situated downstream of the baffle 80.

As the ventilation pipe 70 is also provided adjacent to the baffle 80, preferably a flow cross section of 17% remains in relation to the original flow cross section without a baffle 80 and without a ventilation pipe 70.

In particular, the flow cross section can be reduced to a sufficient extent that a surge is prevented but at the same time filling is possible via the filling opening 18 within a reasonable time, for example 3-5 liters per minute. This results in a baffle size on the basis of these considerations and is preferably more than half of the flow channel cross section, in this exemplary embodiment, therefore, ⅔ of the flow channel cross section.

In this exemplary embodiment, the filler neck 3 is advantageously designed as a separate component and thus shaped such that it can be inserted with a lower end portion downstream of the baffle 80 into a container neck of the container 9. Preferably, the filler neck 3 is produced as a separate component by injection-molding.

In this exemplary embodiment an emblem, not illustrated in more detail, is provided at an outer side of a cover element 4 which is provided on the opening 7, for opening and closing the opening 7, such that the cover element 4 is concealed or inconspicuous from a visual or design aspect.

The features of the invention that are disclosed in the above description, in the drawings and in the claims may be essential to the realization of the invention both individually and in any desired combination.

The invention claimed is:

1. A filling apparatus for a vehicle, comprising:

a body flap, which at least sectionally forms an outer skin of the vehicle and is configured to be pivoted between a first position and a second position, which differs from the first position, wherein the body flap has an opening;

a container for storing a fluid; and a filler neck which is provided on the body flap such that the container is fillable with fluid in a direction of flow via the opening and the filler neck, wherein the filler neck forms a channel which connects the opening in the body flap to the container, a filling portion of the channel being in a region of the opening, a baffle is arranged in the filling portion of the channel, the baffle reducing a flow cross section in relation to the opening arranged upstream of the baffle and in relation to a channel portion of the channel situated downstream of the baffle, wherein a baffle filling opening formed by the baffle determines the reduced flow cross section; and a ventilation pipe is formed adjacent to the baffle filling opening, one end portion thereof extending from the baffle in the direction upstream of the opening and/or the other end portion thereof extending downstream in relation to the baffle.

2. The filling apparatus according to claim 1, wherein the filler neck and the container are configured such that the baffle and the ventilation pipe are arranged above a fluid filling level in the filler neck, which level is based on a predetermined maximum fluid filling level of the container.

3. The filling apparatus according to claim 1, wherein the baffle reduces the flow cross section by ½ to ¾ in relation to the flow cross section of the channel portion downstream of the baffle.

4. The filling apparatus according to claim 1, wherein the baffle reduces the flow cross section by at least ⅔ to ¾ in relation to the flow cross section of the channel portion downstream of the baffle.

5. The filling apparatus according to claim 1, wherein the filler neck is configured as a separate component and is shaped so as to be inserted with a lower end portion downstream of the baffle into a container neck of the container.

6. The filling apparatus according to claim 1, wherein the filler neck is an injection-molded filler neck.

7. A vehicle, comprising:

a filling apparatus for the vehicle, the filling apparatus comprising:

a body flap, which at least sectionally forms an outer skin of the vehicle and is configured to be pivoted between a first position and a second position, which differs from the first position, wherein the body flap has an opening;

a container for storing a fluid; and a filler neck which is provided on the body flap such that the container is fillable with fluid in a direction of flow via the opening and the filler neck, wherein the filler neck forms a channel which connects the opening in the body flap to the container, a filling portion of the channel being in a region of the opening, a baffle is arranged in the filling portion of the channel, the baffle reducing a flow cross section in relation to the opening arranged upstream of the baffle and in relation to a channel portion of the channel situated downstream of the baffle, wherein a baffle filling opening formed by the baffle determines the reduced flow cross section; and a ventilation pipe is formed adjacent to the baffle filling opening, one end portion thereof extending from the baffle in the direction upstream of the opening and/or the other end portion thereof extending downstream in relation to the baffle.

* * * * *